United States Patent [19]

Thompson

[11] Patent Number: 4,832,591
[45] Date of Patent: May 23, 1989

[54] MOLDING PRESS CLOSE AND LOCK SYSTEM

[76] Inventor: William E. Thompson, R.R. 1, Box 89, Middletown, Ind. 47356

[21] Appl. No.: 205,671

[22] Filed: Jun. 13, 1988

[51] Int. Cl.$^4$ .......................... B29C 45/64; B30B 1/10
[52] U.S. Cl. .................................. 425/451.2; 100/272; 425/590; 425/593; 425/451.6
[58] Field of Search ............... 425/589, 590, 592, 593, 425/595, 450.1, 451.2, 451.5, 451.6, 451.9; 100/270, 271, 272

[56] References Cited

U.S. PATENT DOCUMENTS

| | | | |
|---|---|---|---|
| 3,452,399 | 7/1969 | Blumer | 425/593 |
| 3,597,798 | 8/1971 | McDonald | 425/593 |
| 3,609,816 | 10/1971 | McDonald | 425/593 |
| 3,892,509 | 7/1975 | Ruegg | 425/450.1 |
| 4,088,432 | 5/1978 | Farrell | 425/451.6 |
| 4,341,511 | 7/1982 | Laurent et al. | 425/593 |
| 4,345,890 | 8/1982 | Hemmi et al. | 425/451.2 |
| 4,685,876 | 8/1987 | Loscei | 425/593 |

FOREIGN PATENT DOCUMENTS 2306826  12/1976  France ........................ 425/593

Primary Examiner—Jan H. Silbaugh
Assistant Examiner—Jill L. Heitbrink
Attorney, Agent, or Firm—Woodard, Emhardt, Naughton, Moriarty & McNett

[57] ABSTRACT

A die closing and locking apparatus for use in a die press includes a two-part linkage and cylinder combination wherein one part includes a toggle mechanism and the other part includes an annular hydraulic cylinder. The toggle mechanism operates on the closing portion of the die so as to move it into position rapidly and with the minimum time required. The annular hydraulic cylinder acts upon the die in the closing portion so as to apply the required closing force on the die, via the toggle mechanism, prior to the casting or molding operation.

8 Claims, 2 Drawing Sheets

MOLDING PRESS CLOSE AND LOCK SYSTEM

BACKGROUND OF THE INVENTION

The present invention relates in general to closing and locking mechanisms and in particular to such mechanisms which are used to close and lock die halves. Injection molding machines conventoinally have used either toggle mechanisms or straight hydraulic cylinders to close and lock the two die halves together prior to injection of the molding material. Toggle-type mechanisms enable rapid initial closing with a gradual deceleration at the end of the stroke when driven by a relatively small air or hydraulic cylinder. The cylinders are sized to take into consideration the approximate 30:1 mechanical leverage of the toggles at the end of their stroke in order to produce the required press load. However, there are some long-standing disadvantages associated with using load-generating type of toggle movement when compensation has to be made for progressive thermal expansion of the die blocks, elongatation of the tie bars under variable loads, compression of the toggle linkages and uneven adjustment of the tie bar length, all of which which result in various operational problems which increase cost and introduce product defects.

The maximum load-generating capability of a toggle assembly when used in a machine held together with tie bar bolts occurs near the end of toggle extension at a position termed the cross-over point. At this point, the bars have been elastically stretched to nearly full load and the friction within the toggle joints has been overcome by the increasingly greater mechanical advantage of the toggle geometry. The reality of these interactions and the forces at play presents a complex and ever-change condition, one that requires either careful and precise bar-length adjustment to attain a full-load setting or a deliberate over design of the mechanism for a greater load-producing force that operates at a reduced percentage of the design load which in turn permits more latitude in the bar length adjustment.

In view of the variable conditions outlined above, the cross-over point of toggle extension becomes an influence on the machine cycle time. During start procedure when the die temperature is increasing and the molding die is expanding, the toggle extension can reach a condition where the dimensional interference is too large and stops or seriously slows the movement. Even when set reasonably well, this dimensional interference will slow the movement somewhat. The time loss is nonproductive and adds to the cost of the operation. To compensate for this problem, it is common to deliberately accept inadequate die loading during the startup time until the dies reach operational temperature. This represents a similar inefficiency to the overall operation.

Conventional toggle closing and load-generating mechanisms which are designed to apply the maximum closing and die lock force also negate the ability to detect the presence of an obstruction which would seriously damage the die under maximum load. For example, one type of obstruction can occur when a foreign object is lodged between the die faces, such as a portion of a previous casting which has not been extracted properly or a malfunctioning core entry.

The foregoing descriptions of operational problems assumes a condition wherein all tie bars are equally stressed. However, since it is impractical to perfectly balance the pressure area of complex parts made in a molding die, it is necessary to compromise what is called machine squareness, wherein the tie bars are unevenly stressed, a condition that upsets the geometrical operation of the toggle assembly and can cause severe side loading and snapover of the linkage requiring a reduction of the press load. It is to be noted that the design of a toggle linkage is itself a complex elastic assembly and variable loading during the period of load generation is unfavorble to bearing life.

In the application of a straight hydraulic cylinder to generate a die closing and locking action, it is necessary to have adequate pressure area for the load required, one that in turn requires a large amount of hydraulic fluid to be pumped during the die closing stroke, and an inordinant loss of cycle time.

The present invention solves these various operational problems by providing a means to close the molding dies used in a press from an open position to a closed position rapidly and with minimum force by utilizing a toggle mechanism only as a positioning and supporting means that assures that the die faces will be in contact without inertial impact or force great enough to cause damage from trapped material. This is followed up by a short-storke hydraulic cylinder sized to provide the specified die-locking force required by the process. The toggle mechanism when extended presents a fixed dimensional length which cooperates with a hydraulic cylinder which is disposed at one end of the extended toggle mechanism. This combination genertes a force which elastically extends the containment structure of the press under load and covers the required allowance for thermal expansion of the molding dies, thus enabling the press setup to handle the variable conditions encountered during startup and running of the process. Since the toggle linkage operates only as a positioning device at a very low stress during movement, it is not affected by out-of-square process adjustment as the final die-locking force is applied. With this combination of mechanisms, substantial savings in nonproductive opening and closing die movement is made and a constant die-locking force can be relied upon as other process controls are being established.

SUMMARY OF THE INVENTION

A die closing and locking apparatus for use in a die press according to one embodiment of the present invention includes a first platen which is movable relative to the die press and arranged to move one die half, a second platen which is movable relative to the die press and is spaced apart from the first platen, a toggle mechanism having one end attached to the first platen and an opposite end attached to the secondplaten, first drive means arranged with the toggle mechanism to extend and collapse it and second drive means disposed between the second platen and the die press and arranged to move and the second platen.

One object of the present invention is to provide an improved die closing and locking apparatus.

Related objects and advantages of the present invention will be apparent from the following description.

DESCRIPTION OF THE PREFERRED EMBODIMENT

Figure 2:
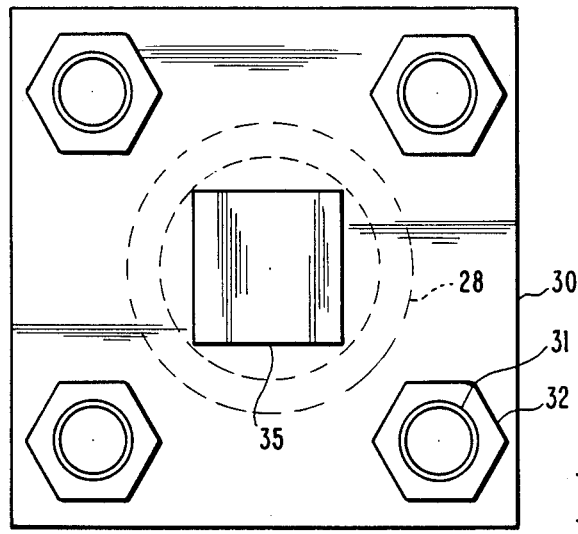
FIG. 2 is a top plan view of the FIG. 1 die closing and locking apparatus.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
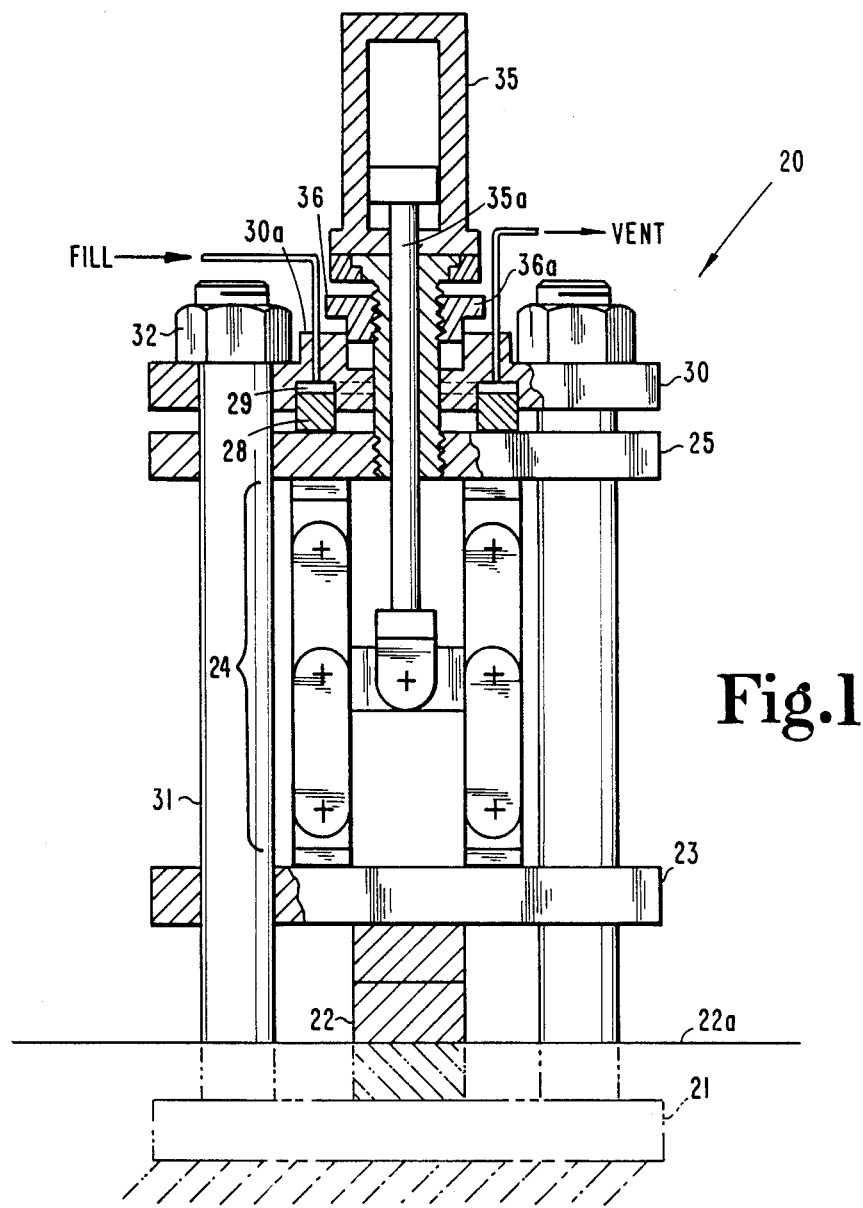
FIG. 1 is a front elevation view fo a die closing and locking apparatus according to a typical embodiment of the present invention.

Referring to FIGS. 1 and 2, there is illustrated a die closing and locking apparatus 20 for a die casting or plastic molding press having a lower stationary platen 21 and an upper movable platen 23. Positioned between the two platens is a two-part (two halves) molding die 22 wherein one half is above the parting line plane 22a and the other die half is below plane 22a. Platen 23 is moved into position by double toggle linkage 24 which is rigidly attached at one end to platen 23 and at the opposite end to a secondary platen 25. Toggle linkage 24 is supported and backed up by platen 25 which is unique to the present invention. Platen 25 is stationary during primary toggle movement but is able to move relative to platen 21 as part of the final die-locking step. Platen 25 is backed up by an annular hydraulic piston 28 within a hydraulic cylinder space 29 that is defined by the rear machine bolster platen 30. Piston 28 is retained in space 29 by platen 30 which is contained under load by the four tie bars 31 and tie bar nuts 32.

A primary toggle drive cylinder 35 extends toward and is rigidly secured to the toggle backup (secondary) platen 25. Cylinder 35 via piston 35a acts directly on the mechanism of the toggle linkage 25 and serves as a means to rapidly move the top half (ejector half) of die 22 into its unlocked casting position. Now being in the extended mode the toggle linkage creates a fixed-length spacer, but has not yet applied the full press load. When a toggle closed signal (via conventional limit switch) is received, hydraulic fluid is introduced into the annular cylinder space 29 to provide the necessary process load, a value that is constant regardless of the stretch of the tie bars or thermal expansion of the molding die, or critical bar length adjustment.

With toggle linkage 24 in its beginning, upper collapsed condition, hydraulic fluid is introduced into space 29 at a relatively low pressure. The pressure force generated by this fluid pushes platen 25 downwardly, the extend of travel of platen 25 and as well cylinder 35 being controlled by the position of adjustment nut 36. As platen 25 moves downwardly bringing with it the cylinder 35, nut 36 also moves toward platen 30. The travel is limited by the abutment of the head collar 36a of nut 36 on the top surface 30a of platen 30. Once the limited movement of platen 25 is taken up, the moderate pressure in space 29 restricts upward movement of platen 25. When piston 35a acts on the toggle linkage, all movement in response thereto is able to be transferred to and taken up by the toggle linkage 24 and not by platen 25.

Once the "full" extension of toggle linkage 25 (not actually fully extended due to an approximate ¼ inch interference) relative to platen 25 is achieved, the hydraulic fluid introduced into space 29 is vented, relieving the downward force on platen 25 and allowing toggle extension to be completed (fixed length).

The next step is to shift from a venting condition for space 29 to a pressurizing condition where hydraulic fluid is reintroduced at substantially higher pressure for achieveing a die-locked condition. In this operation, the hydraulic fluid force acts on platen 25 which now becomes the force transfer means to the fully extended toggle linkage.

Since adjustment nut 36 moves downwardly with the downward movement of platen 25, adjustment nut 36 is used to control the allowable travel of annular piston 28. This travel is relatively short and is set to equal the total elongation of the tie bars under full load plus the compression of all the machine elements at full load, plus the maximum thermal expansion of the molding die, and plus an allowance for setup error, a cumulative total of approximately ¼ inch for an average-sized press.

During the toggle close action, the hydraulic fluid introduced to annular space 29 is open to vent allowing piston 28 to be collapsed within the cylinder the amount of the setup clearance (the typical ¼ inch) and applying minimum load to the die closure. This feature and the purposeful downsizing of the toggle cylinder 35 to only that required for platen movement is a fail-safe feature in case of an interference jam between the die faces, in which case the hydraulic pressure load would not be applied.

Figure 3:
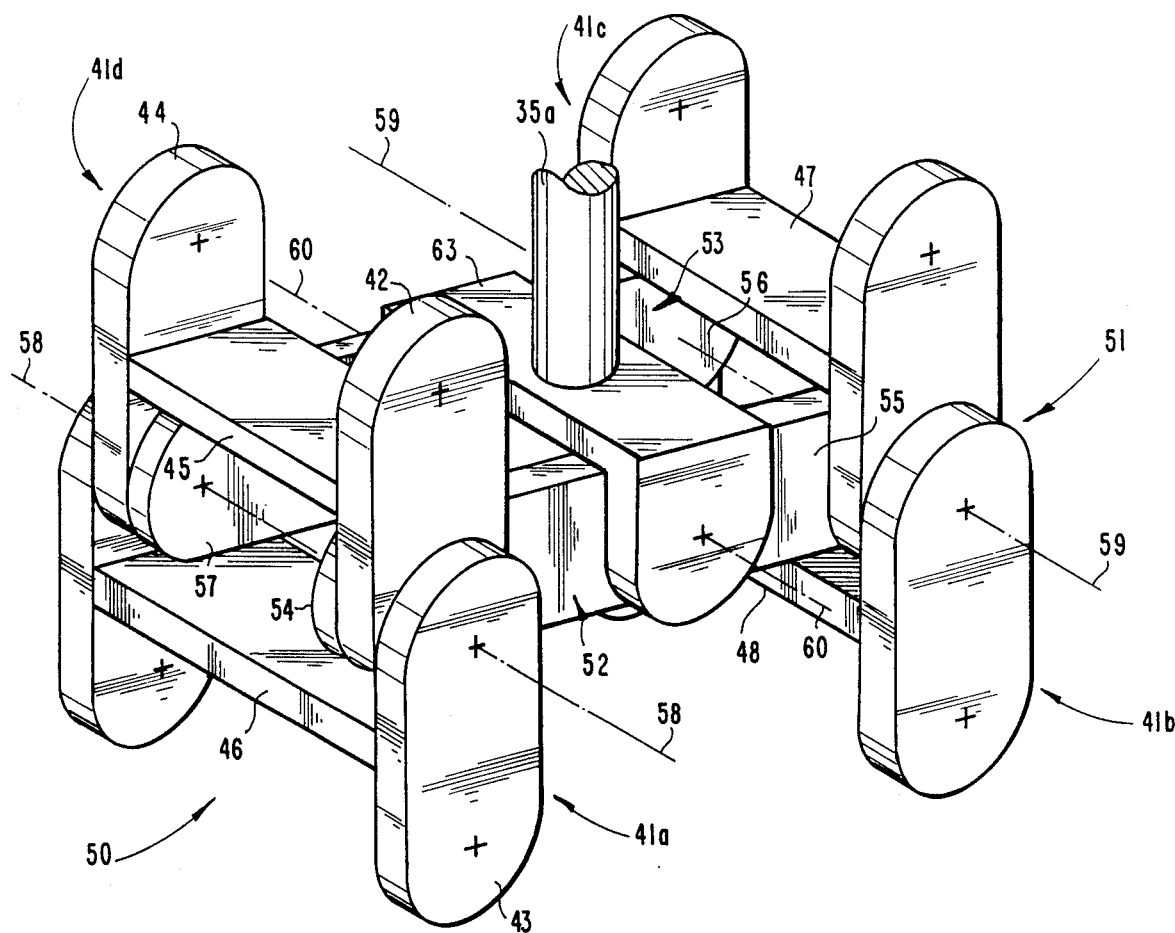
FIG. 3 is a perspective, diagrammatic illustration of a suitable toggle linkage assembly for use in the FIG. 1 die closing and locking apparatus.

Referring to FIG. 3, the toggle linkage 24 is illustrated as a perspective view. As should be understood from the FIG. 1 and FIG. 2 illustrations and from the general nature of the toggle principle, there are a total of four linkage arms 41a–41d arranged front and rear and side-to-side in a type of four-corners arrangement. Each arm is arranged into a pivotally connected, overlapping pair of links 42 and 43 (referring to arm 41a). It is the lower (inner) end of link 42 which is pivotally attached to the upper (inner) end of link 43. The upper link of each linkage arm is rigidly attached to platen 25 by an intermediate member. Similarly, the lower link of each linkage arm is rigidly attached to platen 23 by an intermediate member.

The upper links 42 and 44 of arms 41a and 41d, respectively, are rigidly connected by cross brace 45. As is illustrated, each similarly corresponding pair of links, upper and lower, are connected by corresponding cross braces 46, 47 and 48. The result of this arrangement and of the common point of pivotal connection between the upper and lower links in each arm is the creation of a linkage subassembly 50 on one side of the cylinder piston 35a. A virtually identical linkage subassembly 51 is created on the opposite side of piston 35a. Connecting these two subassemblies together are two further linkage subassemblies 52 and 53. Subassembly 52 includes a pair of bars 54 and 55 which are pivotally attached at one end to each other and at their opposite ends they are respectively pivotally attached to the center pivot point of arms 41a and 41b. Subassembly 53 includes a pair of bars 56 and 57 which are pivotally attached at one end to each other and at their opposite end they are respectively pivotaly atatched to the center pivot point of arms 41c and 41d.

As intended to be illustrated, pivotal axis line 58 is common to the center pivot point of arms 41a and 41d and to the pivot point of attachement of bars 54 and 57. Similarly, pivotal axis line 59 is common to the center pivot point of arms 41b and 41c and to the pivot point of attachment of bars 55 and 56. Further, axis line 58 is substantially parallel to axis line 59 though the location of these lines change as the toggle linkage is collapsed and extended. Pivotal axis line 60 is common to the pivotal points of attachment of bar 54 to bar 55 and of bar 56 to bar 57.

Centrally disposed between linkage subassemblies 52 and 53 is a pivot block 63 which is rigidly attached to the lower end of cylinder piston 35a. Block 63 pivotaly connects to the points of pivotal connection between bars 54 and 55 and between bars 56 and 57 on axis line 60. Axis line 60 is substantially parallel to axis line 58 and 59, and remains so throughout the travel of toggle linkage 24.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A die-closing and locking apparatus for use in a die press to close and open two die halves comprises:
   first platen means movable relative to said die press and arranged to move one of said die halves toward and away from another of said die halves;
   second platen means movable relative to said die press and spaced apart from said first platen means;
   a toggle mechanism having one end attached to said first platen means and an opposite end attached to said second platen means;
   first drive means cooperatively arranged with said toggle mechanism and operably arranged to extend and collapse said toggle mechanism; and
   second drive means disposed between said second platen and said die press and operably arranged to move said second platen wherein said second drive means is an annular cylinder and piston combination wherein the annular piston surrounds the first driving means and is in direct contact against an annular part of the second platen.

2. The apparatus of claim 1 wherein said first drive means includes a first cylinder and first piston combination wherein the first piston is connected to the toggle mechanism.

3. The apparatus fo claim 2 wherein said toggle mechanism includes a total of four two-link arms wherein the two links of each arm are pivotally connected to each other and one pair of arms is connected to a second pair of arms by a cross bar, said first piston is attached to said cross bar.

4. The apparatus of claim 1 wherein said annular cylinder and piston combination includes an annular space disposed between said piston and said die press, and hydraulic fluid introduction means and hydraulic fluid vent means which are connected to the annular space.

5. An apparatus for moving in a closing direction and locking platens comprising:
   a machine frame having a pair of spaced, stationary platens; and
   a closing and locking means disposed between said pair of stationary platens and including:
   (a) a first movable platen movable relative to said frame;
   (b) a second movable platen spaced from said first platen and movable relative to said frame;
   (c) a toggle linkage connected to and between said first and second movable platens;
   (d) drive means connected to said toggle linkage and operable to extend and collapse said toggle linkage; and
   (e) platen control means disposed between one of said stationary platens said frame and
   said secondmovable platen and operable to selectively permit
   or restrict movement of said secondmovable platen wherein said plten control means includes an annulr hydraulic cylinder and piston combintions wherein the annular piston surrounds said drive means and acts directly on an annular part of said second movable platen.

6. the apparatus of claim5 wherein said drive means includes a hydraulic cylinder whichis connected to said toggle linkage.

7. the apparatrus of claim 5 wherein said annular hydraulic cylinder includes fill and vent means for hydraulic fluid and is operable to prevent travel of said second plten in a direction away fromsaid first platen as said toggle linkage is extending from a collapsed condition.

8. The apparatus of claim 5 wherein said toggle linkage includes a total of four two-link arms wherein the two links of each arm are pivotally connected to eachother and one pair of arms is connected to a second pair of arms by a cross bar, saiddrive means being connected to said cross bar.

* * * * *

UNITED STATES PATENT AND TRADEMARK OFFICE
CERTIFICATE OF CORRECTION

PATENT NO. : 4,832,591

DATED : May 23, 1989

INVENTOR(S) : William E. Thompson

It is certified that error appears in the above-indentified patent and that said Letters Patent is hereby corrected as shown below:

In column 1, line 8, change "conventoinally" to --conventionally--.

In column 1, line 20, change "elongatation" to --elongation--.

In column 1, line 24, following the word "of", delete the word "which."

In column 2, line 30, change "genertes" to --generates--.

In column 2, line 53, insert a space between the words "second" and "platen".

In column 2, line 64, change "fo" to --of--.

In column 3, line 40, change the number "25" to --24--.

In column 3, line 67, change the number "25" to --24--.

In column 4, line 8, change "achieveing" to --achieving--.

In column 4, line 63, change "pivotaly" to --pivotally--.

In column 4, line 65, insert the word --is-- following the word "As".

In column 4, line 67, change "attachement" to --attachment--.

In column 5, line 10, change "pivotaly" to --pivotally--.

In column 5, line 49, change "fo" to --of--.

In column 6, line 26, delete the words "said frame".

UNITED STATES PATENT AND TRADEMARK OFFICE
CERTIFICATE OF CORRECTION

PATENT NO. : 4,832,591
DATED : May 23, 1989
INVENTOR(S) : William E. Thompson

It is certified that error appears in the above-indentified patent and that said Letters Patent is hereby corrected as shown below:

In column 6, line 27, change "secondmovable" to --second movable--.

In column 6, line 31, change "plten" to --platen--.

In column 6, lines 31 and 32, change "annulr" to --annular--.

In column 6, line 32, change "combintions" to --combination--.

In column 6, line 36, change "claim5" to --claim 5--.

In column 6, line 37, change "whichis" to --which is--.

In column 6, line 39, change "the apparatrus" to --the apparatus--.

In column 6, lines 47 and 48, change "eachother" to --each other--.

In column 6, line 49, change "saiddrive" to --said drive--.

In column 6, line 30, change "secondmovable" to --second movable--.

Signed and Sealed this

Fourth Day of January, 1994

Attest:

BRUCE LEHMAN

Attesting Officer　　　　Commissioner of Patents and Trademarks